United States Patent
Yang et al.

(10) Patent No.: US 12,354,368 B2
(45) Date of Patent: Jul. 8, 2025

(54) SYSTEMS AND METHODS FOR OBJECT PROXIMITY MONITORING AROUND A VEHICLE

(71) Applicant: Rivian IP Holdings, LLC, Irvine, CA (US)

(72) Inventors: Zengli Yang, Cupertino, CA (US); Muninder Veldandi, Cupertino, CA (US); Saloni Chaturdas Takawale, Sunnyvale, CA (US); Sreenivasulu Gosangi, San Ramon, CA (US); Geoffrey Francis Burns, Palo Alto, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 509 days.

(21) Appl. No.: 17/567,054

(22) Filed: Dec. 31, 2021

(65) Prior Publication Data
US 2023/0033243 A1    Feb. 2, 2023

Related U.S. Application Data

(60) Provisional application No. 63/227,028, filed on Jul. 29, 2021.

(51) Int. Cl.
*G06V 20/58*      (2022.01)
*G06T 3/047*      (2024.01)
(Continued)

(52) U.S. Cl.
CPC .............. *G06V 20/58* (2022.01); *G06T 3/047* (2024.01); *G06T 7/70* (2017.01); *G06V 10/25* (2022.01);
(Continued)

(58) Field of Classification Search
CPC ...... G06V 20/58; G06V 10/25; G06V 10/761; G06T 3/047; G06T 7/70;
(Continued)

(56) References Cited

U.S. PATENT DOCUMENTS

2017/0185089 A1*   6/2017   Mei ...................... G05D 1/0257
2020/0210726 A1*   7/2020   Yang ..................... G06V 10/70
(Continued)

OTHER PUBLICATIONS

"2012-2020 | Model S Enhanced Anti-theft Upgrade," retrieved from https://shop.tesla.com/product/2012-2020-_-model-s-enhanced-anti-theft-upgrade, retrieved on Dec. 12, 2022, pp. 2.
(Continued)

*Primary Examiner* — Nay A Maung
*Assistant Examiner* — Vaisali Rao Koppolu
(74) *Attorney, Agent, or Firm* — Haley Guiliano LLP

(57) ABSTRACT

Systems and methods are provided to generate an object detection representation of a candidate object based on sensor data representing a captured image of an environment surrounding the vehicle. A determination is made as to whether, whether the candidate object is an outlier based on the object detection representation. In response to determining the candidate object is not an outlier, the candidate object is validated as an object, a proximity distance of the object to the vehicle is determined, and the proximity distance of the object is sent as output.

20 Claims, 10 Drawing Sheets

(51) Int. Cl.
  *G06T 7/70* (2017.01)
  *G06V 10/25* (2022.01)
  *G06V 10/74* (2022.01)

(52) U.S. Cl.
  CPC .. *G06V 10/761* (2022.01); *G06T 2207/20081* (2013.01); *G06T 2207/30252* (2013.01); *G06T 2210/12* (2013.01)

(58) Field of Classification Search
  CPC . G06T 2207/20081; G06T 2207/30252; G06T 2210/12; G06T 2207/20084; G06T 2207/30196; G06T 2207/30264; G06T 7/73
  See application file for complete search history.

(56) References Cited

U.S. PATENT DOCUMENTS

| | | | | |
|---|---|---|---|---|
| 2020/0265247 | A1* | 8/2020 | Musk | G06N 20/00 |
| 2020/0279391 | A1* | 9/2020 | Gross | G06T 7/73 |
| 2021/0056326 | A1* | 2/2021 | Kumar | G05D 1/0214 |
| 2021/0209797 | A1* | 7/2021 | Lee | G06T 17/00 |
| 2021/0241035 | A1* | 8/2021 | Sutherland | G06V 10/7784 |
| 2022/0327323 | A1 | 10/2022 | Deshmukh et al. | |

OTHER PUBLICATIONS

Artificial Intelligence & Autopilot, Tesla, retrieved from https://www.tesla.com/autopilotAI, retrieved on Dec. 12, 2022, pp. 6.

Hu, J., et al., "Revisiting Single Image Depth Estimation: Toward Higher Resolution Maps with Accurate Object Boundaries," 2019 IEEE Winter Conference on Applications of Computer Vision (WACV), 9: (2019).

Rashed, H., et al., "Generalized Object Detection on Fisheye Cameras for Autonomous Driving: Dataset, Representations and Baseline," Proceedings of the IEEE/CVF Winter Conference on Applications of Computer Vision (WACV), 2272-2280 (Jan. 2021).

U.S. Appl. No. 17/384,510, title "Systems and Methods for Determining Drivable Space", filed Jul. 23, 2021, 16 Pages.

* cited by examiner

SYSTEMS AND METHODS FOR OBJECT PROXIMITY MONITORING AROUND A VEHICLE

CROSS-REFERENCE TO RELATED APPLICATION

This application claims the benefit of U.S. Provisional Application No. 63/227,028 filed Jul. 29, 2021, the disclosure of which is hereby incorporated by reference herein in its entirety.

INTRODUCTION

In autonomous and semi-autonomous vehicles, it can be useful for the vehicle to determine if there is an object in the road that the vehicle will encounter (or if there is an object in a vicinity of the vehicle when parking the vehicle), and a distance between such object and the vehicle. However, the ability to robustly monitor the proximity of the object to the vehicle given limited computational and energy resources has proved challenging.

SUMMARY

Accordingly, systems and methods are disclosed herein comprising: processing circuitry configured to: generate an object detection representation of a candidate object based on sensor data representing a captured image of an environment surrounding the vehicle; determine, based on the object detection representation, whether the candidate object is an outlier; and in response to determining the candidate object is not an outlier: validate the candidate object as an object; determine a proximity distance of the object to the vehicle; and output the proximity distance of the object.

In some embodiments, a plurality of image sensors configured to generate the sensor data based on captured images of the environment surrounding the vehicle. The plurality of image sensors may be respectively included in a plurality of monocular fisheye cameras.

In some embodiments, the processing circuitry is configured to generate the object detection representation of the candidate object based on the sensor data representing the captured image of the environment surrounding the vehicle based on a trained machine learning model taking as input the captured image and providing an output of an object detection representation.

In some embodiments, the object detection representation comprises a bounding shape relative to the candidate object; and the trained machine learning model was trained using a plurality of training images, each respective training image comprising an annotation of the bounding shape relative and an annotation of a distance from the object to a vehicle associated with the respective training image.

In some embodiments, the processing circuitry is configured to: determine, based on the object detection representation, whether the candidate object is an outlier by using a trained machine learning model taking as input the object detection representation and providing as output: a determination whether the candidate object is associated with a location outside a range of interest; and a determination whether the location of the candidate object is indicative that the candidate object is unlikely to be a valid object.

In some embodiments, a non-transitory computer-readable medium may be provided, having non-transitory computer-readable instructions encoded thereon that, when executed by a processor, causes the processor to: generate an object detection representation of a candidate object based on sensor data representing a captured image of an environment surrounding the vehicle; determine, based on the object detection representation, whether the candidate object is an outlier; and in response to determining the candidate object is not an outlier: validate the candidate object as an object; determine a proximity distance of the object to the vehicle; and output the proximity distance of the object.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
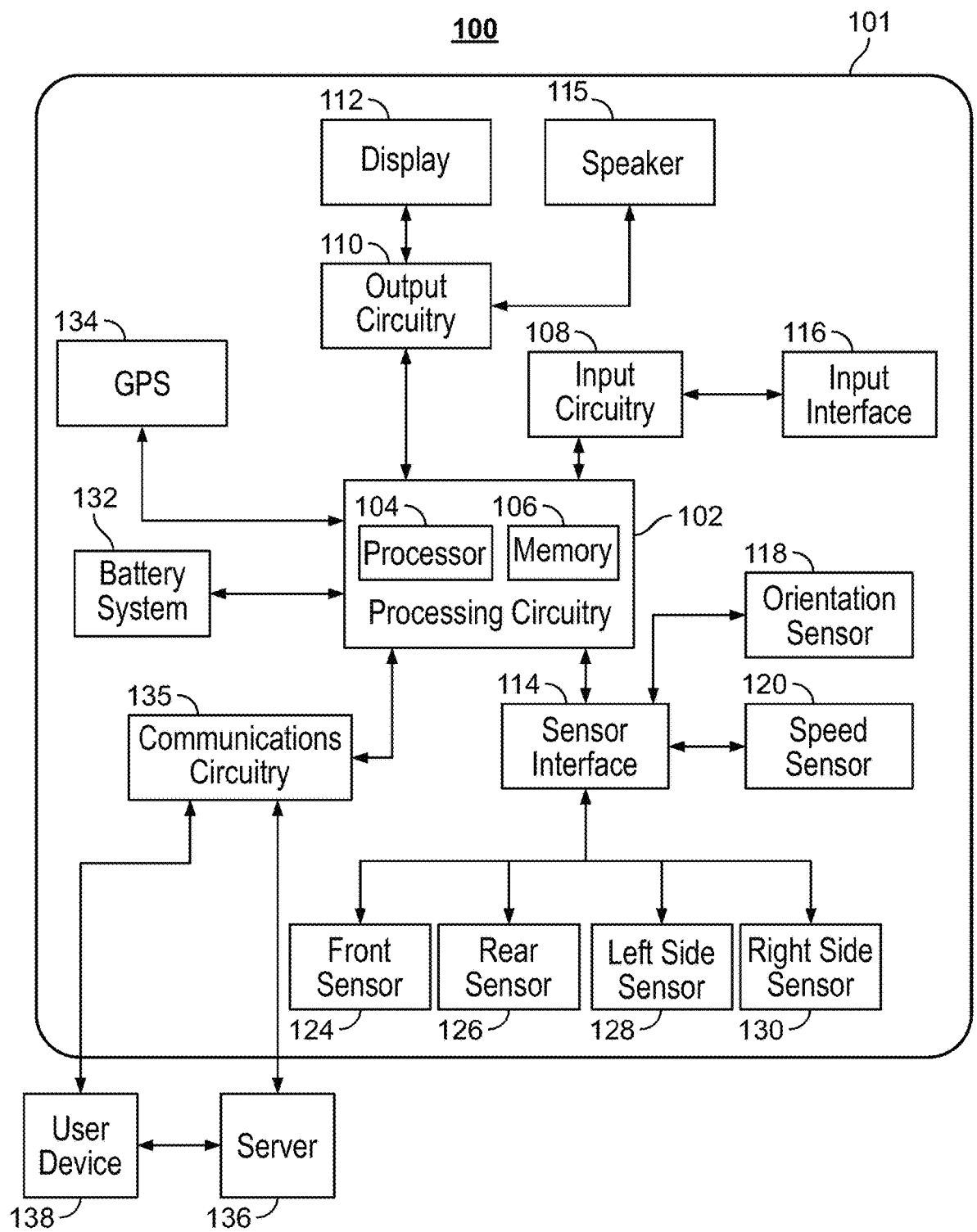
FIG. 1 shows a block diagram of components of a system of a vehicle configured to output a prediction of a distance between vehicle and an object, in accordance with some embodiments of the present disclosure.

FIG. 1 shows a block diagram of components of a system of a vehicle 101 configured to output a prediction of a distance between vehicle 101 and an object, in accordance with some embodiments of the present disclosure. Vehicle 101 may be a car (e.g., a coupe, a sedan, a truck, an SUV, a bus, or any other suitable vehicle, or any combination thereof), a motorcycle, an aircraft (e.g., a drone, or any other suitable aircraft, or any combination thereof), a watercraft (e.g., a boat, or any other suitable watercraft, or any combination thereof), or any other type of vehicle.

Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 100. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to input interface 116 (e.g., a steering wheel, a touch screen display, buttons, knobs, a microphone or other audio capture device, or any other suitable input interface, or any combination thereof) via input circuitry 108. In some embodiments, a driver of vehicle 101 may be permitted to select certain settings in connection with the operation of vehicle 101. In some embodiments, processing circuitry 102 may be communicatively connected to GPS system 134 or other positioning device of vehicle 101, where the driver may interact with the GPS system via input interface 116. GPS system 134 may be in communication with multiple satellites and/or servers 136 remote from vehicle 101 to ascertain the driver's location and provide navigation directions to processing circuitry 102. As another example, the positioning device operate may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with the vehicle (e.g., a location of a home of the user stored in memory 106, or any other suitable location, or any combination thereof). In some embodiments, processing circuitry 102 uses the determined location to identify whether vehicle 101 is within a threshold range of a tagged location.

Processing circuitry 102 may be communicatively connected to display 112 and speaker 115 by way of output circuitry 110. Display 112 may be located at a dashboard of vehicle 101 and/or a heads-up display at a windshield of vehicle 101. For example, an interface for GPS system 134 or an interface of an infotainment system may be generated for display, and display 112 may comprise an LCD display, an OLED display, an LED display, or any other type of display. Speaker 115 may be located at any location within the cabin of vehicle 101, e.g., at the dashboard of vehicle 101, on an interior portion of the vehicle door, or any other suitable location, or any combination thereof.

Processing circuitry 102 may be communicatively connected (e.g., by way of sensor interface 114) to sensors (e.g., front sensor 124, rear sensor 126, left side sensor 128, right side sensor 130, orientation sensor 118, speed sensor 120, or any other suitable sensors, or any combination thereof). Orientation sensor 118 may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 120 may be one of a speedometer, a GPS sensor, or the like, or any combination thereof, and may be configured to provide a reading of the vehicle's current speed to processing circuitry 102. Front sensor 124, rear sensor 126, left side sensor 128, and/or right side sensor 130 may be positioned at a variety of locations of vehicle 101, and may be one or more of a variety of types, e.g., an image sensor, an ultrasonic sensor, a radar sensor, LED sensor, LIDAR sensor, or any other suitable sensor, or any combination thereof. For example, one or more of such sensors may be configured to measure the distance between vehicle 101 and an object in a surrounding environment of the vehicle (e.g., by outputting a light or radio wave signal, and measuring a time for a return signal to be detected and/or an intensity of the returned signal, and/or performing image processing on images captured by the image sensor of the surrounding environment of vehicle 101). In some embodiments, processing circuitry 102 may take into account the acceleration of vehicle 101, e.g., based on sensor data generated by orientation sensor 118, when determining a predicted distance between vehicle 101 and an object. In some embodiments, processing circuitry 102 may utilize the obtained sensor data in performing autonomous or semi-autonomous parking of vehicle 101 and/or in performing autonomous or semi-autonomous navigation of vehicle 101.

Processing circuitry 102 may be communicatively connected to battery system 132, which may be configured to provide power to one or more of the components of vehicle 101 during operation. In some embodiments, vehicle 101 may be an electric vehicle or a hybrid electric vehicle.

In some embodiments, communications circuitry 135 and/or user device 138 (e.g., a mobile device, such as for example, a smartphone, a tablet, a key fob, or any other suitable user device, or any combination thereof) may be in communication with one or more servers 136 (e.g., over a communications network such as, for example, the Internet, or any other suitable communications network, or any combination thereof), which may be configured to perform any suitable portions of the processing described above and below.

It should be appreciated that FIG. 1 only shows some of the components of vehicle 101, and it will be understood that vehicle 101 also includes other elements commonly found in vehicles (e.g., electric vehicles or any other suitable vehicle or any combination thereof), e.g., a motor, brakes, wheels, wheel controls, turn signals, windows, doors, etc.

Figure 2:
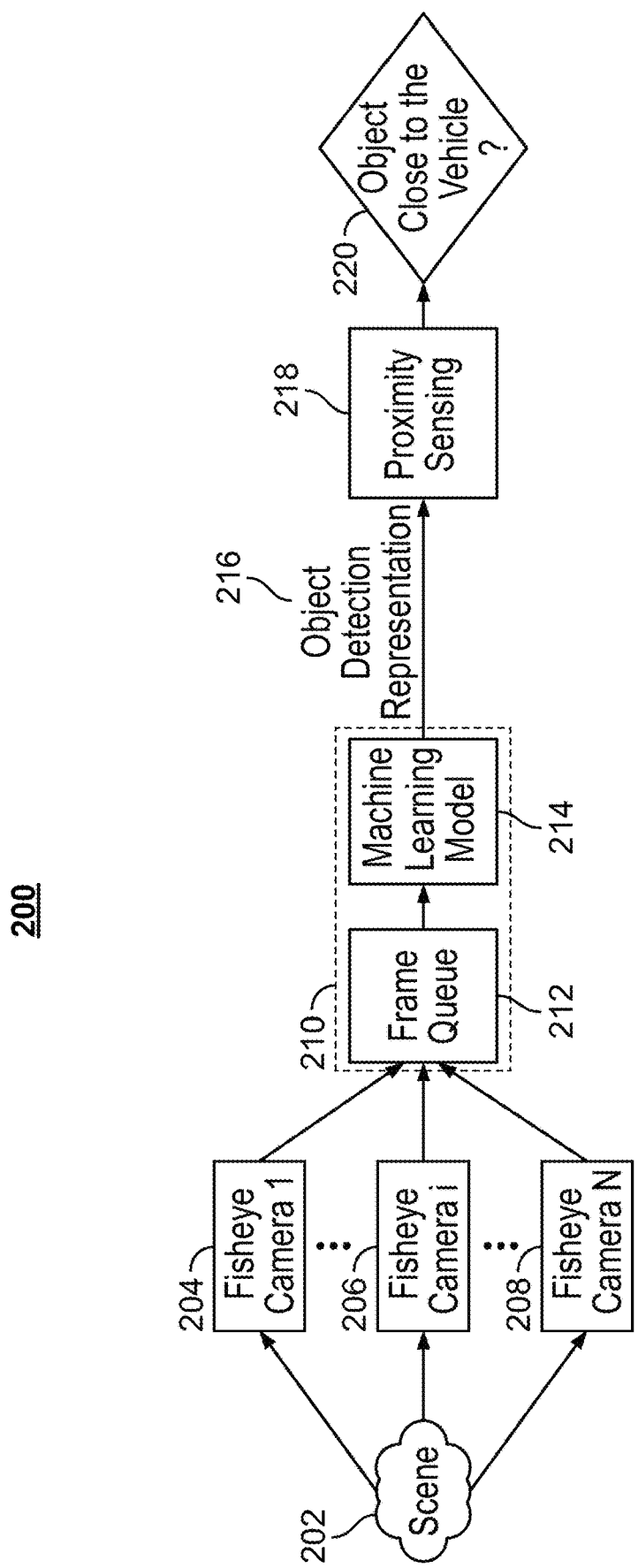
FIG. 2 shows a block diagram a system of a vehicle configured to output a prediction of a distance between vehicle and an object, in accordance with some embodiments of the present disclosure.

FIG. 2 shows a block diagram a system 200 of vehicle 101 configured to output a prediction of a distance between vehicle 101 and an object, in accordance with some embodiments of the present disclosure. System 200 may comprise multiple cameras 204, 206, 208, and object detection network 210, and proximity sensing module 218. In some embodiments, one or more components (e.g., object detection network 210 and proximity sensing module 218, or any other suitable components, or any combination thereof) of system 200 may be implemented by processing circuitry 102 (and/or processing circuitry of server 136). One or more of cameras 204, 206, 208 may correspond to one of sensors 124, 126, 128, 130.

Cameras 204, 206, 208 may be mounted on any suitable internal or external portion of vehicle 101. In some embodiments, one or more of cameras 204, 206, 208 may correspond to monocular fisheye cameras configured to cover a wide field of view around vehicle 101. While FIG. 2 depicts three cameras, it should be appreciated that any suitable number of cameras may be employed (e.g., less than three cameras or more than three cameras, such as, for example, four cameras respectively positioned at a front, rear and each side of vehicle 101). Such cameras may be mounted at any suitable respective positions of vehicle 101 in order to facilitate the capturing images of the entire region or environment 202 around vehicle 101, while vehicle 101 is stationary or in motion. A series of images may be captured by cameras 204, 206, 208, including any suitable number of images. In some embodiments, images may be captured repeatedly, e.g., at a predetermined frequency, to capture the surrounding environment of vehicle 101 over time.

One or more images or frames captured by cameras 204, 206, 208 may be input to object detection network 210, e.g., comprising frame queue 212 and machine learning model 214 (e.g., a neural network or any other suitable machine learning model or any combination thereof). Object detection network 210 may be configured to identify one or more candidate objects in the images captured by cameras 204, 206, 208 using any suitable image recognition technique. In some embodiments, processing circuitry 102 may manipulate any of the series of captured images such that a candidate object is located at a similar position across all camera images. Object detection network 210 may be configured to output one or more 2D object detection representations 216 for the one or more candidate objects. For example, object detection network 210 may be configured to draw 2D bounding shapes (e.g., bounding boxes, bounding polygons, bounding triangles, bounding ellipses, bounding circles, etc.) around candidate objects (e.g., vehicles, humans, animals, or other obstacles) positioned in front of, behind, or to a side of vehicle 101. Frame queue 212 may store the plurality of images captured by cameras 204, 206, 208 of the surrounding environment of vehicle 101, and such images may be input to machine learning model 214 in, e.g., a first-in first-out manner, or using any other suitable scheme, or any combination thereof. Machine learning model 214 may be a neural network, e.g., a convolutional neural network (CNN), or any other suitable machine learning model, or any combination thereof, trained to accept as input an image of a surrounding environment of vehicle 101 and output respective object detection representations 216 for the one or more candidate objects. Object proximity to vehicle 101 may be estimated based on the object detection representation, as discussed in more detail in connection with FIG. 3. In some embodiments, one or more of cameras 204, 206, 208 correspond to a fisheye camera which produces a relatively large distortion based on its wide-angle lens, and machine learning model 214 may be trained using images having a distortion similar to the distortion produced by fisheye camera lens. In some embodiments, separate training images may be used for training the model with respect to a parking scenario as compared to a scenario in which vehicle 101 is navigating a road or off-road.

Calculation of a bounding box or other bounding mechanism may be performed in any manner, such as by known computer vision-based methods and processes for identifying an object and fitting a box to its outer edges. For example, objects and their outer boundaries may be identified and located within an image using any methods such as edge detection methods, feature searching methods, probabilistic object models, graph matching, histograms of oriented gradients (HOGs) fed into classifiers such as support vector machines, Haar Cascade classifiers, and the like. Any suitable methods are contemplated. In some embodiments, 2D bounding boxes may be fitted to identified objects in any manner, such as by drawing a rectangular box whose edges are both oriented parallel to the axes of the camera coordinate system, and are each tangent to an outer edge of the identified object. In some embodiments, 2D bounding boxes may be fitted to identified objects by drawing a rectangular box whose vertical edges are oriented parallel to an axis of vehicle 101 whose orientation is determined by an orientation sensor of vehicle 101. Neural networks and bounding boxes are discussed in more detail in commonly owned application Ser. No. 17/384,510, filed Jul. 23, 2021, the entire contents of which is hereby incorporated by reference herein.

In some embodiments, one or more machine learning models 214 may be trained to learn patterns and features associated with certain classes of objects, e.g., a person, a car, a bus, a motorcycle, a train, a bicycle, background, etc. In some embodiments, such machine learning models may be trained to learn patterns and features associated with sub-classes (e.g., a sedan, a minivan, a truck, or any other suitable sub-class) of a class (e.g., cars, or any other suitable class). Classification may be carried out by machine learning model 214 comprising one or more machine learning models, such as, for example, a CNN trained to receive input images of objects surrounding a vehicle (e.g., where the image may be annotated with any suitable bounding shape relative to an object and/or a distance from vehicle to object annotation and/or a class of object annotation), and output likelihoods that these vehicles correspond to particular vehicle categories. Such CNNs may be trained on training data sets containing images of vehicles manually tagged with their particular vehicle types. In some embodiments, any combination of the following classes may be employed in training and/or evaluating the model (e.g., background, airplane, bicycle, bird, boat, bottle, bus, car, cat, chair, cow, dining table, dog, horse, motorbike, motorcycle, person, potted plant, sheep, sofa, train, TV monitor, truck, stop sign, traffic light, traffic sign, motor, or any other suitable class, or any combination thereof). In some embodiments, a confidence score may be output along with the prediction of a class to which an identified object belongs (e.g., 86% probability that an identified object is a human being, or any other suitable probability). In some embodiments, the confidence score may be compared to a predefined threshold confidence score in determining how to classify the object.

In some embodiments, any suitable batch size may be used in training the model (e.g., 32, 64, or any other suitable size, or any combination thereof). In some embodiments, a hard negative mining technique may be employed, and a neg_pos_ratio for hard negative mining may be any suitable value (e.g., 3, 5, or any other suitable value, or any combination thereof). In some embodiments, any suitable number and value of weights may be applied to the classes of objects (e.g., to account or entropy loss). For example, the classes of bicycle, bus, car, motorcycle, person, and train may be assigned respective weights of 1.25, 0.9, 0.9, 0.9, 0.9. 1.25, 0.9. In some embodiments, a prior or standard box being used as a baseline starting point may be updated based on the characteristics of a bounding shape of a particular object (e.g., person).

Figure 3:
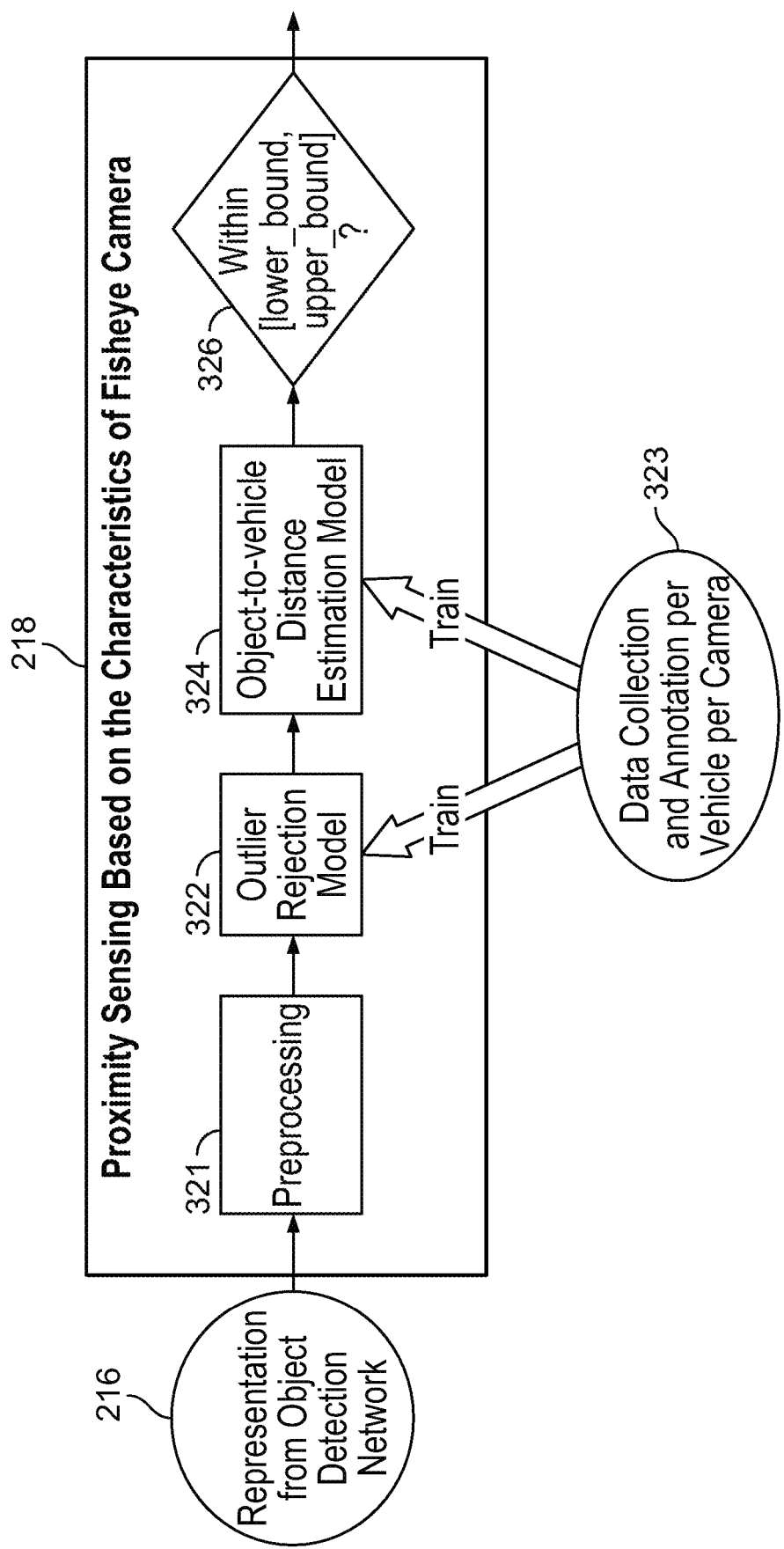
FIG. 3 shows a block diagram a system of a vehicle configured to output a prediction of a distance between vehicle and an object, in accordance with some embodiments of the present disclosure.

Proximity sensing module 218 (discussed in more detail in FIG. 3) may be configured to output a determination 220 of a proximity of the candidate object (associated with object detection representation 216) to vehicle 101. As shown in FIG. 3, proximity sensing module 218 may comprise outlier rejection model 322 and object-to-vehicle distance estimation model 324, or any other suitable components, or any combination thereof. In some embodiments, one or more components (e.g., outlier rejection model 322 and object-to-vehicle distance estimation model 324, or any other suitable components, or any combination thereof) of proximity sensing module 218 may be implemented by processing circuitry 102 (and/or processing circuitry of server 136).

Proximity sensing module 218 may receive one or more object detection representations 216 from object detection network 210, and perform preprocessing at 121, e.g., to extract suitable features from object detection representation 216, and/or convert object detection representation 216 into a suitable numerical (e.g., vector or matrix) representation, and/or match formatting of object detection representation 216 to formatting of training data 323, normalization, resizing, minimization, etc. In some embodiments, preprocessing may comprise In some embodiments, brightening the image or portions thereof, darkening the image or portions thereof, color shifting the image (e.g., among color schemes, from color to grayscale, or other mapping), cropping the image, scaling the image, adjusting an aspect ratio of the image, adjusting contrast of an image, performing any other suitable processing to prepare image, or any combination thereof. Any suitable number of features of the candidate object may be input to proximity sensing module 218 (e.g., an x coordinate, a y coordinate, a height, a width, or any other suitable features associated with an object, or any combination thereof).

Outlier rejection model 322 of proximity sensing module 218 may be trained to take as input the object detection representation 216 (e.g., optionally, after preprocessing 321) and output a determination whether the candidate object is an outlier. For example, such determination may be based on whether the candidate object is likely to be a false detection of an object (e.g., if the candidate object is positioned at a portion of the image corresponding to a location at which the identified object is unlikely to be located, such as, for example, if an object classified as a person is determined to be located in the sky, or any other suitable scenario likely to be a false detection of an object, or any combination thereof) and/or a prediction regarding whether the detected candidate object is outside or beyond a range of interest (e.g., 8 feet from body of vehicle, 10 feet from body of vehicle, or any other suitable distance). In some embodiments, outlier rejection model 322 may be implemented as a classification algorithm (e.g., a Naïve Bayes algorithm, a Support Vector Machine, a logistic regression, linear regression, random forest, a nearest neighbor algorithm, and/or any other suitable classifier or machine learning model, or any combination thereof). Classifiers are discussed in more detail in connection with commonly owned U.S. application Ser. No. 17/225,518 filed Apr. 8, 2021, the entire contents of which are hereby incorporated by reference herein in their entirety. In some embodiments, the output of outlier rejection model 322 may be utilized in performing autonomous or semi-autonomous parking of vehicle 101 and/or in performing autonomous or semi-autonomous navigation of vehicle 101, e.g., determining an object is present in a vicinity of vehicle 101 (or that the object is associated with a false detection) and performing or recommending suitable action based on the determination. In some embodiments, separate training images may be used for training the model with respect to a parking scenario as compared to a scenario in which vehicle 101 is navigating a road or performing off-road navigation.

If a candidate object is determined to be a false detection or outside the range of interest, the candidate object may be disregarded or rejected, e.g., not used in monitoring conditions of vehicle 101, such as for example, when vehicle 101 is being parked on navigating a road or off-road terrain. Outlier rejection model 322 may be trained using commonly observed training images of false positives of image detections, e.g., observed during the course of training object detection network 210 and labeled as false positives, and/or trained using a targeted subset of data used to train machine learning model 214. Outlier rejection model 322 may be adopted to be robust against widely-seen false positives from object detection network. In some embodiments, outlier rejection model 322 may determine that candidate object is likely a false detection if a bounding shape associated with a candidate object is too far from vehicle 101 and/or the bounding box associated with a candidate object corresponds to a location in an input image at which there is unlikely to be a valid object (e.g., a minivan or person being identified as in the sky).

In some embodiments, training data may be divided into multiple groups. For example, outlier rejection model 322 may be trained using training images in which an object is within 8 feet from a vehicle (e.g., manually tagged to indicate a distance from the object to the vehicle), and object-to-vehicle distance estimation model 324 may be trained on using training images in which an object is within 10 feet from a vehicle (e.g., manually tagged to indicate a distance from the object to the vehicle). In some embodiments, outlier rejection model 322 and/or object-to-vehicle distance estimation model 324 may be trained to learn that a particular class of object (e.g., a vehicle or a person) being of a certain size and at a certain location corresponds to a particular distance from vehicle 101. In some embodiments, outlier rejection model 322 and/or object-to-vehicle distance estimation model 324 may be trained to learn a correlation between box size height (e.g., pixelwise), distance (e.g., pixelwise) from center of box, and other parameters, with a distance between an object and a vehicle.

In response to determining the candidate object is (i) within the range of interest and (ii) not a false detection of an object, the candidate object may be validated as a detected object, and processing may continue to object-to-vehicle distance estimation model 324. Model 324 may be employed to monitor the environment surrounding vehicle 101 and estimate or predict a distance between the validated detected object and vehicle 101. Model 324 may be trained using training images of surrounding images of vehicle 101 annotated with an indication of a distance between vehicle 101 and the object for the particular training image, and may output a prediction as to whether the validated detected object is within a predefined range of vehicle 101 (e.g., 8 feet or 10 feet, or any other suitable distance). In some embodiments, at 326, an upper bound and a lower bound of any suitable distance values may be compared to the output of model 324 in determining a distance of the object from the vehicle associated with cameras having captured images of a surrounding area of the vehicle. In some embodiments, the lower bound may be, e.g., 4 feet, or any other suitable distance. In some embodiments, post-processing techniques may be employed (e.g., Non-maximum Suppression (NMS), or any other suitable technique, or any combination thereof). The processing described in connection with FIG. 3 may be performed on each captured individually or collectively, such that one or more outputs associated with the image data from the plurality of images may be fused together to facilitate the monitoring of the object of interest around vehicle 101 within the range of interest. Accordingly, accurate object-to-vehicle distance estimation may be realized with reliable detection and little false alarm, object proximity may be monitored with good range around vehicle 101. Moreover, in some embodiments, all image and vision processing can be realized on one low-power electronic control unit (ECU), which can run in an always-on mode that has minimal impact on driving range and battery lifetime, thereby having minimal impact on driving range and battery lifetime due to the computational efficiency and low-power requirements of the disclosed systems and methods. In some embodiments, the systems and methods described herein may be utilized in autonomous and/or semi-autonomous driving applications.

Figure 4:
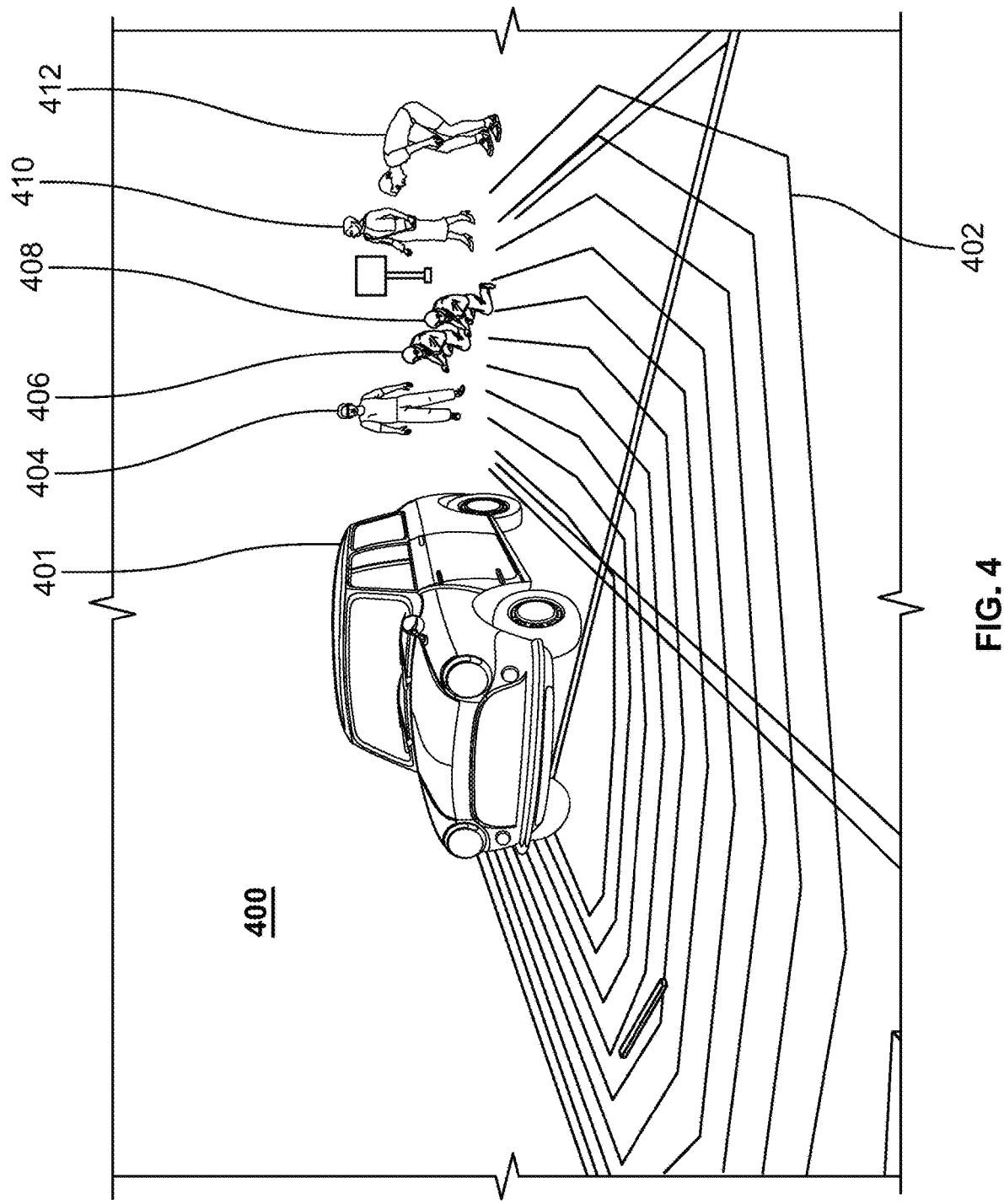
FIG. 4 shows an exemplary training image used to train a machine learning model, in accordance with some embodiments of the present disclosure.

FIG. 4 shows an exemplary training image used to train a machine learning model, in accordance with some embodiments of the present disclosure. Training image 400 may comprise a depiction of vehicle 401. In some embodiments, any suitable number of training images may be used, and a diverse group of training images (e.g., showing a variety of different objects and different vehicles at varying distances from each other in various different environments and captured from various cameras of vehicle 401, or any other suitable images, or any combination thereof) may be used to train one or more machine learning models (e.g., model 214 of FIG. 2 and/or model 322 of FIG. 3 and/or model 324 of FIG. 3, or any other suitable machine learning model, or any combination thereof). In some embodiments, in certain training images, contour web 402 may be employed in the environment in which training images are captured and contour web 402 may be depicted in training images (e.g., contour web 402 may span any suitable distance, for example, contour web 402 may span 10 feet total, where each element of the web may be spaced apart 1 foot, or any other suitable total distance and/or spaced apart distances may be employed, or any combination thereof). In some embodiments, training images may be annotated with one or more of bounding boxes and distances between the vehicle and the object (e.g., in feet or any other suitable measurement scheme). In some embodiments, training image 400 may comprise a fisheye image of any suitable size (e.g., a 1376×976 fisheye image, or any other suitable size, or any combination thereof). In some embodiments, the training data may be captured with any suitable number of persons (e.g., persons 404, 406, 408, 410, 412) walking around or otherwise present in a vicinity of vehicle 401. In some embodiments, each respective camera (e.g., one or more of images sensors 124, 126, 128, 130) may capture any suitable number of training images (e.g., at least 1000 images depicting objects within one or more particular distances, e.g., 10 feet, from vehicle 401).

Figure 5:
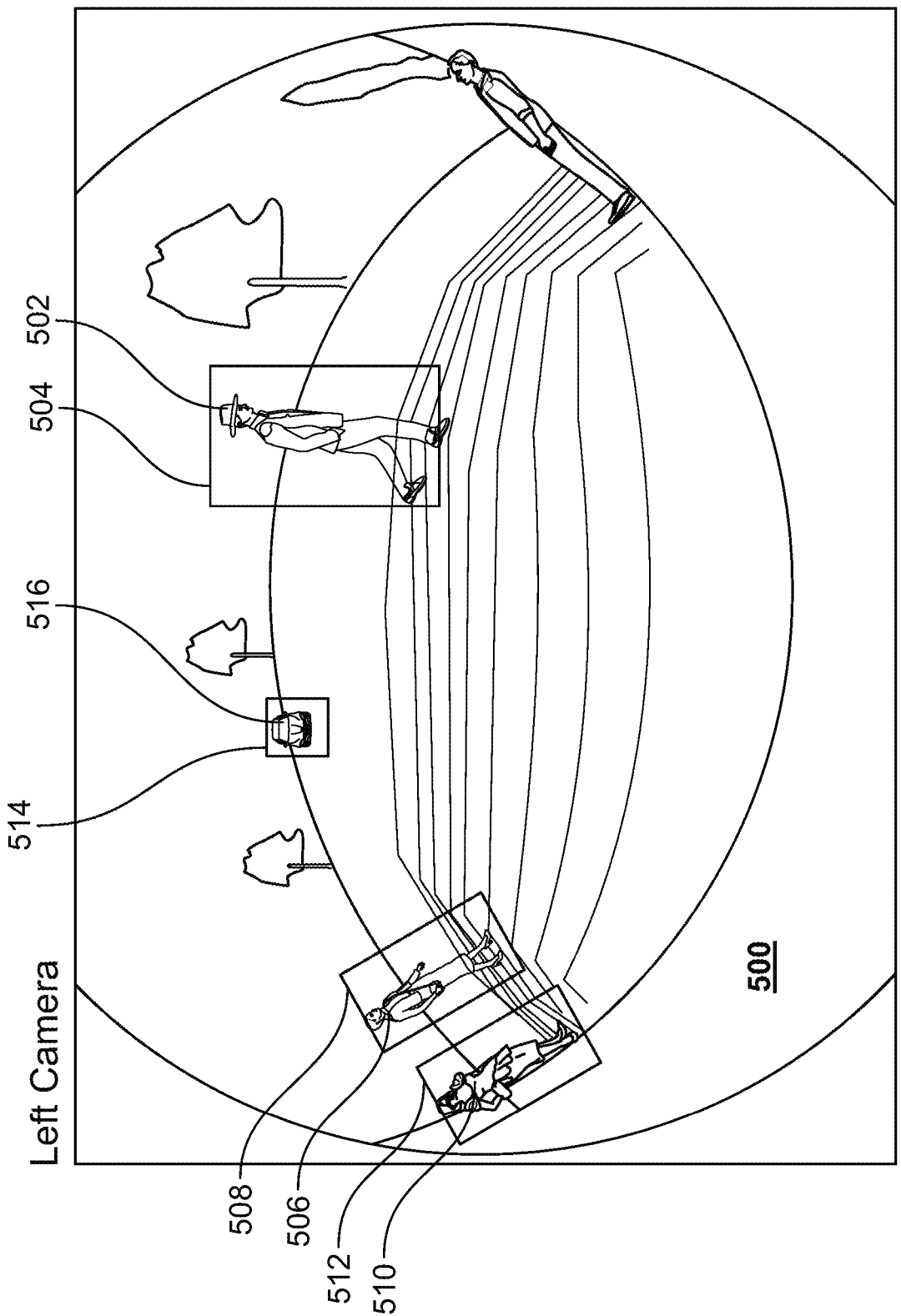
FIG. 5 shows an exemplary training image used to train a machine learning model, in accordance with some embodiments of the present disclosure.

FIG. 5 shows an exemplary training image 500 used to train a machine learning model, in accordance with some embodiments of the present disclosure. Training image 500 may be taken from camera 204, 206, 208 and may depict object 502 (e.g., a person). In some embodiments, a person-to-vehicle distance may be estimated based on bounding box 504 of person 502 detected by from camera 204, 206, 209, and may be based on an assumption of a person in a particular pose (e.g., upright). A machine learning model (e.g., model 214 of FIG. 2 and/or model 322 of FIG. 3 and/or model 324 of FIG. 3) may be trained with different weights for different camera locations. In some embodiments, one or more of such machine learning models (e.g., model 324) may correspond to a random forest model, where training accuracy may be improved by increasing a number of decision trees and depths, and/or a linear regression model may be adopted. In some embodiments, object 516 associated with bounding box 514 may be included in training image 500.

Any suitable number of features may be used in training the one or more machine learning models. For example, where $x_c$, $y_c$, w, h respectively denote center coordinates, width, height of an object, any suitable combination of the following features may be used: $c_x$, $c_y$, 1/w, 1/h, $1/w^2$, $1/h^2$, 1/wh, $y^2$ in training (and/or in receiving output from) model 324. In some embodiments, outlier rejection model 322 may be used to reject false detections and objects exceeding a predefined range (e.g., 8 feet) from the vehicle. In some embodiments, object-to-vehicle distance estimation model 324 may be trained using annotated data within a predefined range (e.g., 10 feet). In some embodiments, training image 500 may further include depictions of objects 506 and 510 respectively corresponding to bounding boxes 508, 512.

Figure 6:
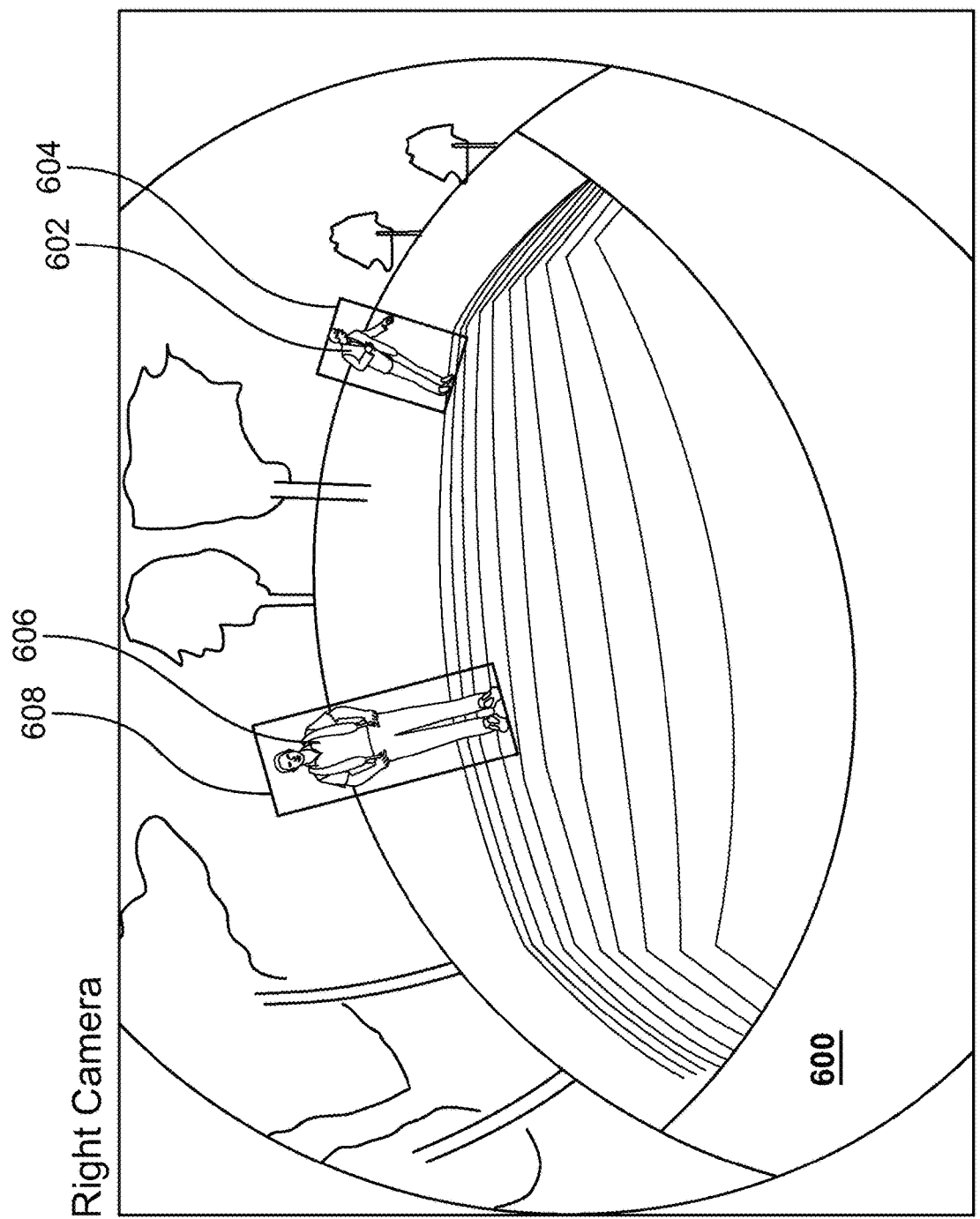
FIG. 6 shows an exemplary training image used to train a machine learning model, in accordance with some embodiments of the present disclosure.

FIG. 6 shows an exemplary training image 600 used to train a machine learning model, in accordance with some embodiments of the present disclosure. Training image 600 may depict objects 602, 606 and corresponding bounding boxes 604, 608. Training image 600 may be captured by a right-side camera of vehicle 101 (e.g., a fisheye camera).

Figure 7:
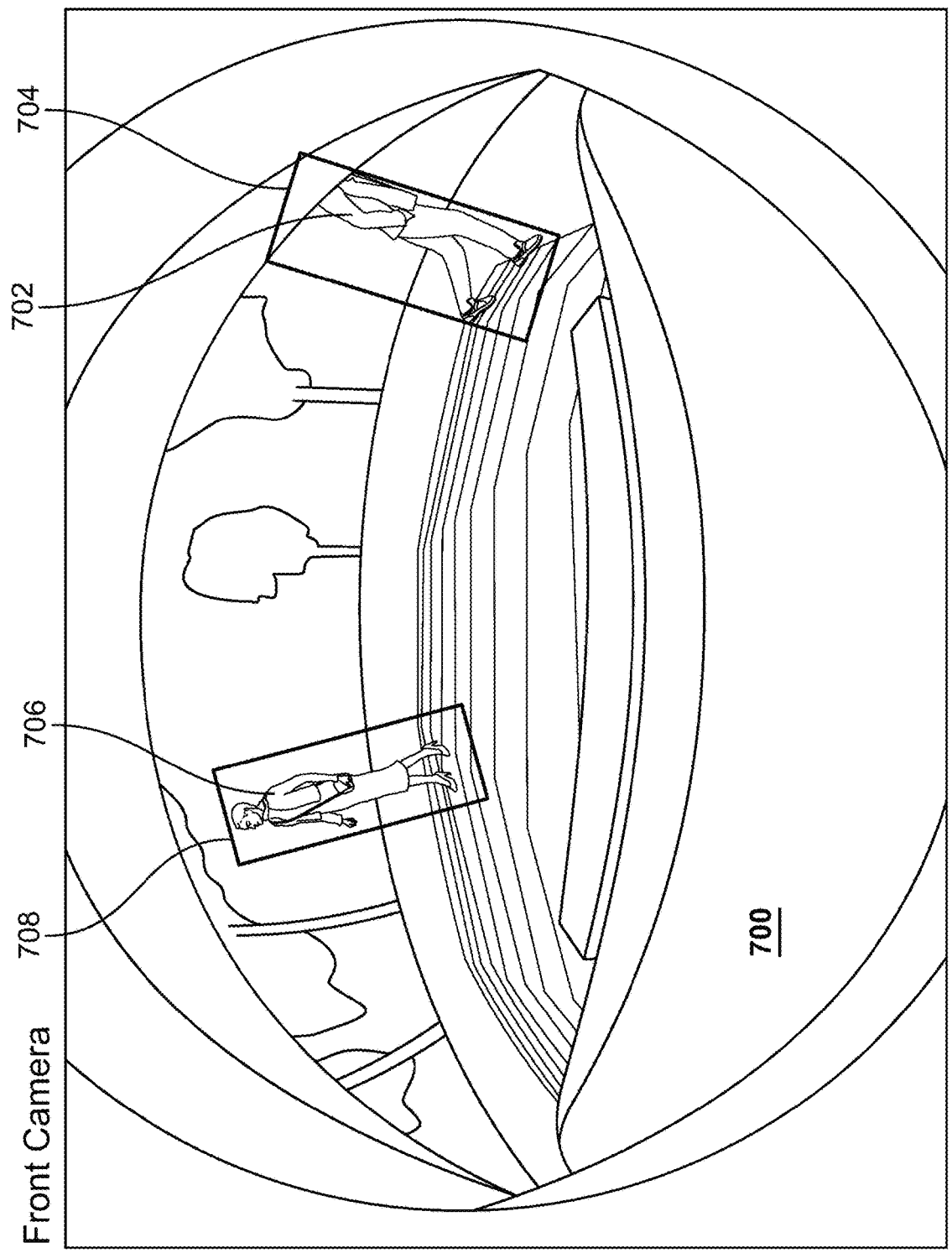
FIG. 7 shows an exemplary training image used to train a machine learning model, in accordance with some embodiments of the present disclosure.

FIG. 7 shows an exemplary training image 700 used to train a machine learning model, in accordance with some embodiments of the present disclosure. Training image 700 may depict objects 702, 706 and corresponding bounding boxes 704, 708. Training image 700 may be captured by a front camera of vehicle 101 (e.g., a fisheye camera).

Figure 8:
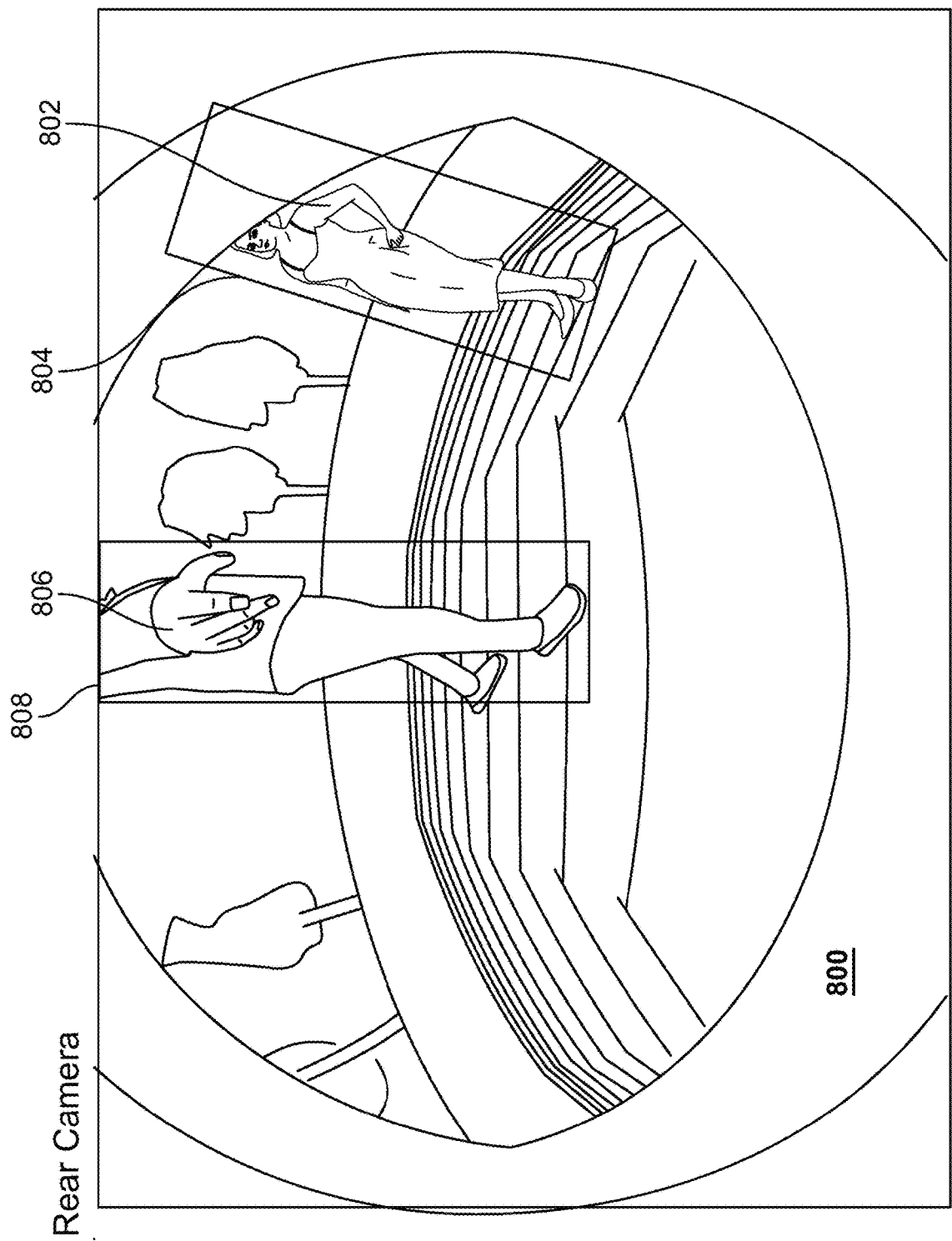
FIG. 8 shows an exemplary training image used to train a machine learning model, in accordance with some embodiments of the present disclosure.
Figure 9A:
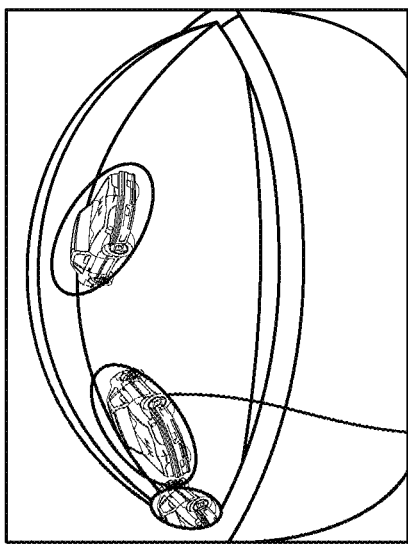
FIGS. 9A-9F shows exemplary bounding shapes which may be utilized in annotating training images for one or more machine learning models, in accordance with some embodiments of the present disclosure.
Figure 9D:
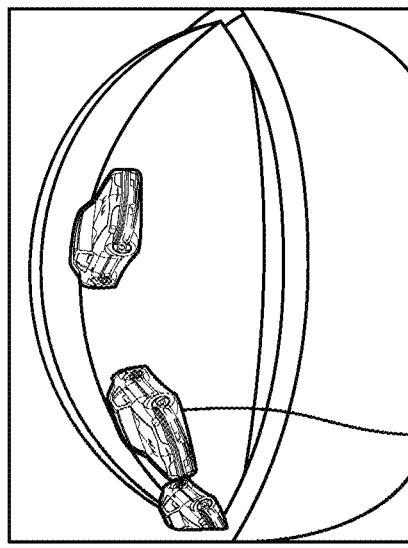
Figure 9B:
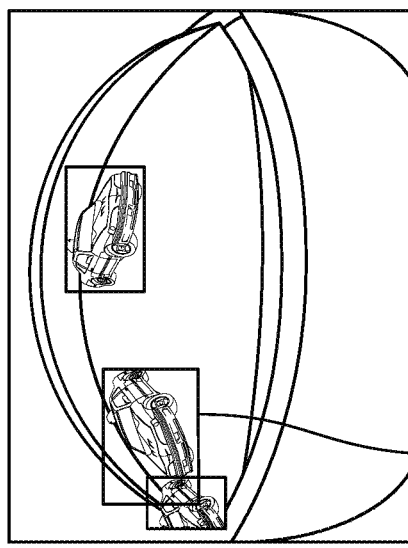
Figure 9E:
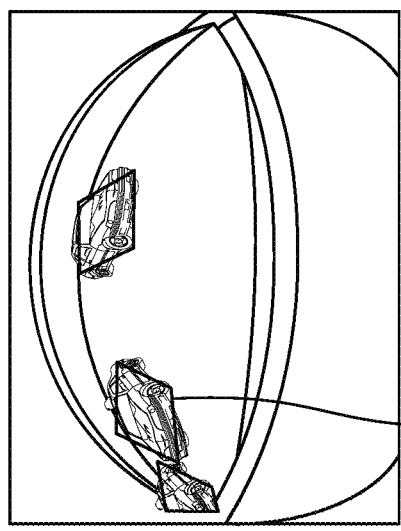
Figure 9C:
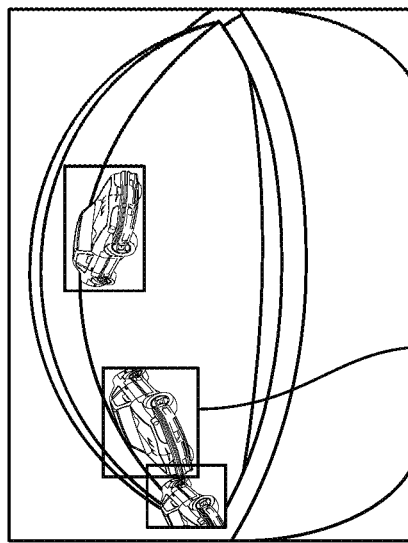
Figure 9F:
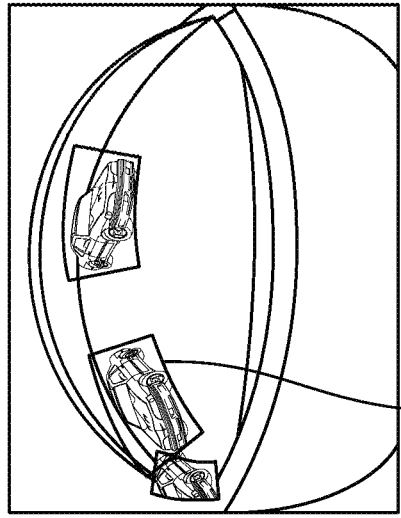

FIG. 8 shows an exemplary training image 800 used to train a machine learning model, in accordance with some embodiments of the present disclosure. Training image 800 may depict objects 802, 806 and corresponding bounding boxes 804, 808. Training image 800 may be captured by a rear camera of vehicle 101 (e.g., a fisheye camera).

In some embodiments, in training the one or more machine learning models to recognize a particular object (e.g., people) depicted in an image, various classes of the particular object may be annotated in the training data. For example, any suitable number of classes (e.g., 12) may be used for annotation to indicate the person at different distances from a vehicle (e.g., different annotations for a distance of 3 feet; a distance larger than 10 feet, a person at an unknown distance; a person of whom at least a portion thereof, such as the depicted face, is occluded, etc.). In some embodiments, the bounding box may cover substantially all portions of the depicted human being as well as clothes and shoes of the depicted human being, and the object may be annotated after a predefined number of frames (e.g., every 3 to 5 frames, which may be verified by counting a number of marks on the ground if the training data includes web 402 of FIG. 4). In some embodiments, a training image may be re-sized to a higher or lower resolution (e.g., 300×300 resolution, or any number of other suitable resolutions, or any combination thereof) using any suitable technique. For example, one or more training images may be downsampled, e.g., to reduce the amount of data in, and/or decrease the resolution of, the one or more images to enable the one or more images to be more easily processed and/or consume less storage space. Additionally or alternatively, one or more training images may be upsampled, e.g., to increase the amount of data in, and/or increase the resolution of (e.g., from a default resolution) of, the one or more images to enable one or more features of the one or more images to be more clearly ascertained, e.g., by the machine learning model in training the model and/or in utilizing the trained model.

FIGS. 9A-9F shows exemplary bounding shapes which may be utilized in annotating training images for one or more machine learning models, in accordance with some embodiments of the present disclosure. In some embodiments, various 2D object detection representations may be used in captured images (e.g., fisheye camera images). For example, a bounding shape may comprise standard box 902 of FIG. 9A, oriented box 904 of FIG. 9B, ellipse 906 of FIG. 9C, curved box 908 of FIG. 9D, polygon 910 having any suitable number of points (e.g., 4, or any other suitable number) of FIG. 9E, polygon 910 having any suitable number of points (e.g., 24, or any other suitable number) of FIG. 9F. Depending on a position, size and shape of an object depicted in the captured image, different bounding configurations may be more suitable for particular instances.

In some embodiments, in an object-to-vehicle distance estimation (e.g., a person-to-vehicle distance estimation to trigger a threaten event), any suitable metric may be employed. For example, equation (1) for a Root Mean Squared Error (RMSE) metric may be used for each discrete distance:

$$RMSE(d) = \sqrt{\frac{\sum_{i=1}^{N_d}(d - p_d^i)^2}{N}} \quad (1)$$

where $d \in \{1,2, 3, 4, 5, 6, 7, 8, 9, 10\}$ with unit of feet being the ground-truth distance between person to vehicle, $p_d^i$ is the i-th predicated distance when the ground-truth distance is d ft., $N_d$ is the number of samples with ground-truth distance as d ft. In some embodiments, annotations may not be evenly distributed across all the locations, in which case suitable weighting or biases may be utilized. In some embodiments, an overall metric of a mean of RMSE over all the available discrete distances in the data collection and annotation may be used as shown in equation (2):

$$mRMSE = \frac{1}{d_{max} - d_{min}} \sum_{d=d_{min}}^{d_{max}} RMSE(d) \quad (2)$$

In some embodiments, $d_{max}=10$ and $d_{min}$ may be 1 or 2. In some embodiments, the front camera may have a narrow field of view (FOV), and $d_{min}$ may be 1. Assuming a human may have a width of more than 1 foot, mRMSE within 1 foot may be sufficient and was observed from each camera. In some embodiments, testing may be performed based on output from machine learning model 214.

In evaluating the performance of one or more of the disclosed machine learning models (e.g., machine learning model 214, outlier rejection model 322, object-to-vehicle distance estimation model 324), a True Positive (TP), False Positive (FP), False Negative (FN), and True Negative (TN). An intersection over union (IOU) threshold may be utilized, indicting a measure of overlap of a predicted bounding shape as compared to an actual bounding shape for an object. A TP may be a correct detection, within IOU threshold); FP may be a wrong detection, with IOU<threshold, and if there is more than one detection overlapping a ground truth, the first detection may be considered as TP while others are FP; FN may be when a ground truth is not detected; and True Negative may not apply. In some embodiments, various quantities may be measured, e.g., precision, recall and average precision. Precision may be understood as the ability of a model to identify only relevant objects, i.e., the percentage of correct positive predictions and is given by:

$$Precision = \frac{TP}{TP - FP} = \frac{TP}{\text{all detections}}$$

Recall may be understood as the ability of a model to find all the relevant cases (all ground truth bounding boxes), i.e., the percentage of true positive detected among all relevant ground truths and is given by:

$$Recall = \frac{TP}{TP - FN} = \frac{TP}{\text{all ground truths}}$$

Average Precision (AP) may be computed by calculating an area under a curve (AUC) of the Precision×Recall curve. AP is a metric to evaluate precision and recall in different confidence values, and accordingly an amount of TP and FP classifications given different confidence levels may be determined.

Exemplary metrics which may be used in evaluating the machine learning model may include: AP with IOU Threshold t=0.5, which may be used to measure the AP of each class individually by computing the area under the precision×recall curve interpolating all points, and in order to classify detections as TP or FP the IOU threshold may be set to t=0.5; AP@0.5 and AP@0.75 (used to evaluate the precision×curve, the interpolation may performed in N=101 recall points, and the computed results for each class may be summed up and divided by the number of classes, and taking the average among all computed results). In some embodiments, one or more of the disclosed machine learning models may be tested with any suitable dataset.

Figure 10:
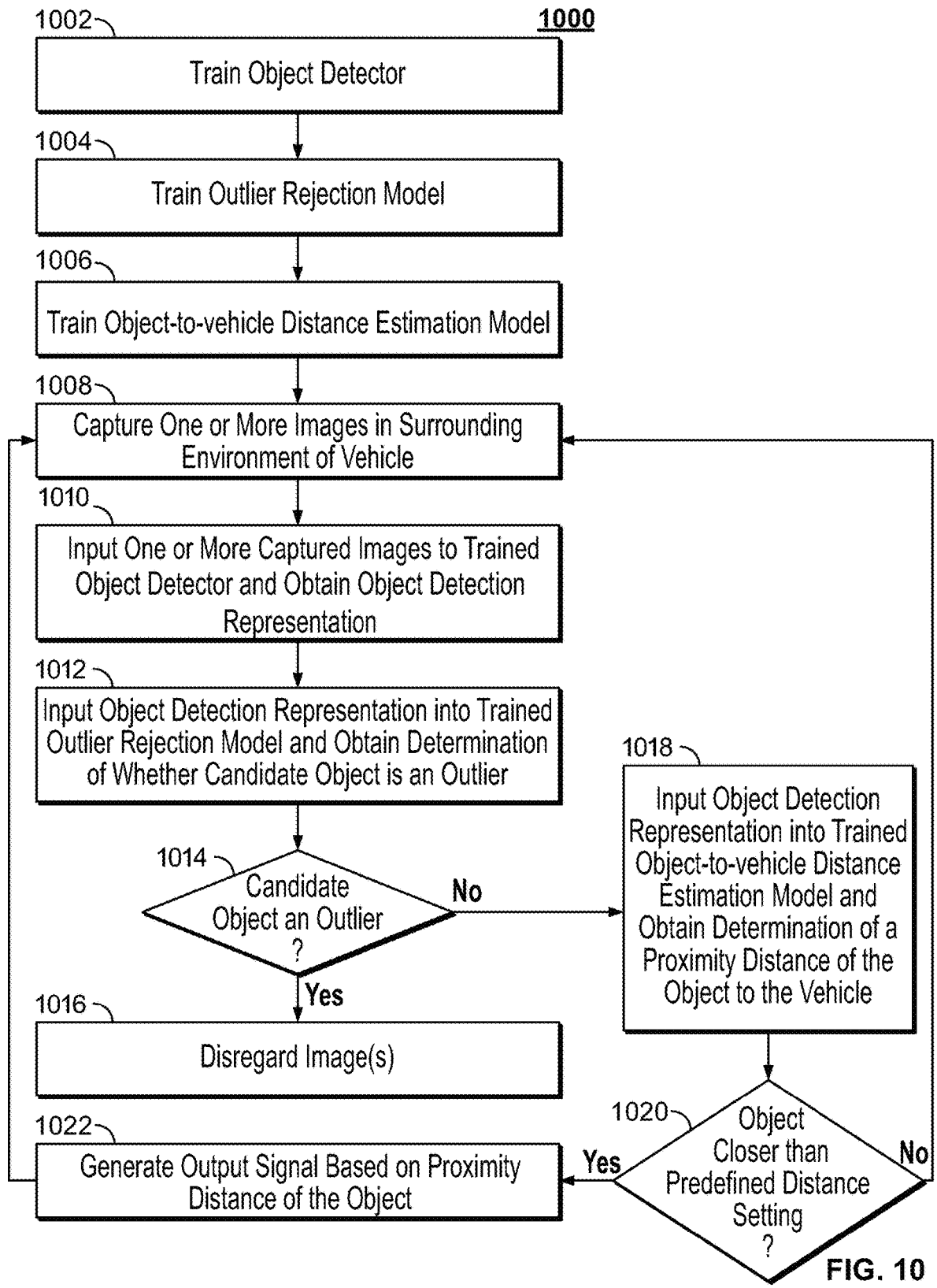
FIG. 10 shows a flowchart of illustrative process for outputting a prediction of a distance between vehicle and an object, in accordance with some embodiments of the present disclosure.

FIG. 10 shows a flowchart of illustrative process for outputting a prediction of a distance between vehicle and an object, in accordance with some embodiments of the present disclosure. Process 1000 may be executed at least in part by processing circuitry 102 of vehicle 101 and/or processing circuitry of server 136.

At 10102, processing circuitry 102 may train machine learning model 214 using any suitable number of training images of an environment around vehicle 101, e.g., captured by cameras 204, 206, 208, which may be wide-angle fisheye cameras. In some embodiments, the training images of machine learning model 214 may comprise an annotation appended thereto, or otherwise input to model with the training image, where the annotation indicates a particular class (e.g., person, car, bus, motorcycle, train, bicycle, etc.) and/or a vehicle to object distance annotation. In some embodiments, a set of training images may correspond to parking scenarios (e.g., in a parking lot, on a side of a road, in a driveway, off-road, etc.), and another set of training images may correspond to navigation scenarios, e.g., driving vehicle 101 on the road or off-road.

At 1004, processing circuitry 102 may train outlier rejection model 322 using any suitable number of training images of an environment around vehicle 101, e.g., captured by cameras 204, 206, 208, which may be wide-angle fisheye cameras. In some embodiments, outlier rejection model 322 may be trained using the training data of machine learning model 214 or a portion thereof (, e.g., indicating annotations of distances between objects and a subject vehicle, and/or including commonly observed false positive detections of candidate objects). In some embodiments, outlier rejection model 322 may be trained using training images in which an object is within 8 feet from a vehicle (e.g., manually tagged to indicate a distance from the object to the vehicle). In some embodiments, a set of training images may correspond to parking scenarios (e.g., in a parking lot, on a side of a road, in a driveway, off-road, etc.), and another set of training images may correspond to navigation scenarios, e.g., driving vehicle 101 on the road or off-road.

At 1006, processing circuitry 102 may train object-to-vehicle distance estimation model 324 using any suitable number of training images of an environment around vehicle 101, e.g., captured by cameras 204, 206, 208, which may be wide-angle fisheye cameras. In some embodiments, object-to-vehicle distance estimation model 324 may be trained using the training data of machine learning model 214 or a portion thereof, e.g., indicating annotations of distances between objects and a subject vehicle. In some embodiments, object-to-vehicle distance estimation model 324 may be trained on using training images in which an object is within 10 feet from a vehicle (e.g., manually tagged to indicate a distance from the object to the vehicle). In some embodiments, a set of training images may correspond to parking scenarios (e.g., in a parking lot, on a side of a road, in a driveway, off-road, etc.), and another set of training images may correspond to navigation scenarios, e.g., driving vehicle 101 on the road or off-road.

At 1008, cameras 204, 206, 208 may capture images in a surrounding environment of vehicle 101. Any suitable number of images may be captured at any suitable capture rate. In some embodiments, such environment of vehicle 101 may correspond to, e.g., a parking lot, a driveway, a portion off a road, or off-road, such as, for example, if vehicle 101 is being parked. In some embodiments, such environment of vehicle 101 may correspond to, e.g., a road or off-road such as, for example, if vehicle 101 is being navigated, e.g., amongst other moving vehicles on-road or off-road.

At 1010, processing circuitry 102 may cause captured images may be input to trained neural network object detector 214, which may be configured to identify objects depicted in an input image and output obtain an object detection representation 216 associated with the object. For example, a bounding shape may be generated surrounding the edges of the identified object.

At 1012, processing circuitry 102 may input object detection representation 216 into proximity sensing module 218. More specifically, pre-processing may be performed on object detection representation 216, and the optionally pre-processed object detection representation 216 may be input to outlier rejection model 322, which may be configured to output a prediction whether object detection representation 216 is a falsely identified object and/or is beyond a range of interest (e.g., 10 feet) from vehicle 101.

At 1014, based on the output of proximity sensing module 218, processing circuitry 102 may determine whether object detection representation 216 is an outlier. For example, processing circuitry 102 may determine whether the candidate is located at a portion of the image (e.g., a sky) where an object of that particular class (e.g., a person) is unlikely to be detected, and/or is beyond a range of interest (e.g., 10 feet) from vehicle 101. If the output indicates object detection representation 216 is a falsely identified object and/or is beyond a range of interest (e.g., 10 feet) from vehicle 101, the image(s) may be discarded at 1016. Otherwise, processing may proceed to 1018, where the candidate object may be validated as an object.

At 1018, object detection representation 216 may be input into trained object-to-vehicle distance estimation model 324 to obtain a determination of a proximity distance of the object to the vehicle obtain a prediction of proximity to vehicle. For example, based on the output of object-to-vehicle distance estimation model 324, the distance between vehicle 101 and the validated object may be constantly determined.

At 1020, processing circuitry 102 may determine, based on a determination output by object-to-vehicle distance estimation model 324 of the distance between vehicle 101 and the validated object, whether the object is closer than a predefined distance setting (e.g., within 8 feet or within 10 feet from an external body of vehicle 101). If the validated object is determined to be closer to vehicle 101 than the predefined setting, processing may proceed to 1022, where an output signal may be generated based on the proximity distance of the object, e.g., an alert may be output to an operator of vehicle 101. On the other hand, if processing circuitry 102 determines based on the output of object-to-vehicle distance estimation model 324 that the object is not within a predefined distance setting, processing may return to 1008, to capture additional images of an environment surrounding vehicle 101, to continue to monitor such environment by iteratively performing the subsequent steps.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system of a vehicle, the system comprising:
 processing circuitry configured to:
  generate an object detection representation of a candidate object based on sensor data representing a captured image of an environment surrounding the vehicle;
  determine whether the candidate object is an outlier or is a valid object by:
   determining, based on the object detection representation, whether a location of the candidate object in the environment surrounding the vehicle is outside a distance-based range of interest from the vehicle;
  in response to determining the candidate object is the valid object:
   validate the candidate object as an object;
   determine, based on the object detection representation, a proximity distance of the object to the vehicle; and
   output the proximity distance of the object; and
  in response to determining the candidate object is not the valid object:
   discard the captured image, without validating the candidate object and without determining the proximity distance of the object to the vehicle.

2. The system of claim 1, further comprising:
 a plurality of image sensors configured to generate the sensor data based on captured images of the environment surrounding the vehicle.

3. The system of claim 2, wherein the plurality of image sensors is respectively included in a plurality of monocular fisheye cameras.

4. The system of claim 1, wherein the processing circuitry is configured to:
 generate the object detection representation of the candidate object based on the sensor data representing the captured image of the environment surrounding the vehicle based on a first trained machine learning model taking as input the captured image and providing an output of the object detection representation.

5. The system of claim 4, wherein:
the object detection representation comprises a bounding shape relative to the candidate object; and
the first trained machine learning model was trained using a plurality of training images, each respective training image comprising an annotation of the bounding shape relative to the candidate object and an annotation of a distance from the object to a vehicle associated with the respective training image.

6. The system of claim 1, wherein the processing circuitry is configured to:
determine, based on the object detection representation, whether the candidate object is the valid object by using a second trained machine learning model taking as input data corresponding to the object detection representation and providing as output:
the determination whether the location of the candidate object in the environment surrounding the vehicle is outside the distance-based range of interest from the vehicle; and
a determination whether the location of the candidate object is indicative that the candidate object is unlikely to be the valid object.

7. A method comprising:
generating an object detection representation of a candidate object based on sensor data representing a captured image of an environment surrounding the vehicle;
determining whether the candidate object is an outlier or is a valid object by:
determining, based on the object detection representation, whether a location of the candidate object in the environment surrounding the vehicle is outside a distance-based range of interest from the vehicle;
in response to determining the candidate object is the valid object:
validating the candidate object as an object;
determining, based on the object detection representation, a proximity distance of the object to the vehicle; and
outputting the proximity distance of the object; and
in response to determining the candidate object is not the valid object:
discarding the captured image, without validating the candidate object and without determining the proximity distance of the object to the vehicle.

8. The method of claim 7, wherein the sensor data is generated by a plurality of image sensors configured to generate the sensor data based on captured images of the environment surrounding the vehicle.

9. The method of claim 8, wherein the plurality of image sensors is respectively included in a plurality of monocular fisheye cameras.

10. The method of claim 7, wherein performing the generating of the object detection representation of the candidate object based on the sensor data representing the captured image of the environment surrounding the vehicle based on a first trained machine learning model taking as input the captured image and providing an output of the object detection representation.

11. The method of claim 10, wherein:
the object detection representation comprises a bounding shape relative to the candidate object; and
the first trained machine learning model was trained using a plurality of training images, each respective training image comprising an annotation of the bounding shape relative to the candidate object and an annotation of a distance from the object to a vehicle associated with the respective training image.

12. The method of claim 7, further comprising:
determining, based on the object detection representation, whether the candidate object is the valid object by using a second trained machine learning model taking as input data corresponding to the object detection representation and providing as output:
the determination whether the location of the candidate object in the environment surrounding the vehicle is outside the distance-based range of interest from the vehicle; and
a determination whether the location of the candidate object is indicative that the candidate object is unlikely to be the valid object.

13. A non-transitory computer-readable medium having non-transitory computer-readable instructions encoded thereon that, when executed by a processor, causes the processor to:
generate an object detection representation of a candidate object based on sensor data representing a captured image of an environment surrounding a vehicle;
determine whether the candidate object is an outlier or is a valid object by:
determining, based on the object detection representation, whether a location of the candidate object in the environment surrounding the vehicle is outside a distance-based range of interest from the vehicle;
in response to determining the candidate object is the valid object:
validate the candidate object as an object;
determine, based on the object detection representation, a proximity distance of the object to the vehicle; and
output the proximity distance of the object; and
in response to determining the candidate object is not the valid object:
discard the captured image, without validating the candidate object and without determining the proximity distance of the object to the vehicle.

14. The non-transitory computer-readable medium of claim 13, wherein the sensor data is generated by a plurality of image sensors configured to generate the sensor data based on captured images of the environment surrounding the vehicle.

15. The non-transitory computer-readable medium of claim 14, wherein the plurality of image sensors is respectively included in a plurality of monocular fisheye cameras.

16. The non-transitory computer-readable medium of claim 13, wherein the execution of the instructions causes the object detection representation of the candidate object to be generated based on the sensor data representing the captured image of the environment surrounding the vehicle based on a first trained machine learning model taking as input the captured image and providing an output of the object detection representation.

17. The non-transitory computer-readable medium of claim 16, wherein:
the object detection representation comprises a bounding shape relative to the candidate object; and
the first trained machine learning model was trained using a plurality of training images, each respective training image comprising an annotation of the bounding shape relative to the candidate object and an annotation of a distance from the object to a vehicle associated with the respective training image.

18. The non-transitory computer-readable medium of claim 13, wherein the execution of the instructions causes the processor to:
determine, based on the object detection representation, whether the candidate object is the valid object by using a second trained machine learning model taking as input data corresponding to the object detection representation and providing as output:
the determination whether the location of the candidate object in the environment surrounding the vehicle is outside the distance-based range of interest from the vehicle; and
a determination whether the location of the candidate object is indicative that the candidate object is unlikely to be the valid object.

19. The system of claim 1, wherein the processing circuitry is further configured to determine, based on the object detection representation, that the candidate object is not the valid object by:
determining that the location of the candidate object in the environment is unlikely for a type of object that the candidate object is classified as.

20. The system of claim 19, wherein the processing circuitry is further configured to determine that the candidate object is not the valid object by:
identifying a ground region in the captured image of the environment surrounding the vehicle;
identifying a sky region in the captured image of the environment surrounding the vehicle;
determining that the candidate object is located in the sky region in the captured image; and
determining that the type of object that the candidate object is classified as is unlikely to be present in the sky region.

* * * * *